(12) United States Patent
Wu

(10) Patent No.: US 8,610,779 B2
(45) Date of Patent: Dec. 17, 2013

(54) METHOD AND SYSTEM FOR MONITORING OPERATION OF AN LED DISPLAY SCREEN

(75) Inventor: Hanqu Wu, Shenzhen (CN)

(73) Assignee: Shenzhen Aoto Electronics Co., Ltd., Shenzhen (CN)

( * ) Notice: Subject to any disclaimer, the term of this patent is extended or adjusted under 35 U.S.C. 154(b) by 132 days.

(21) Appl. No.: 13/073,668

(22) Filed: Mar. 28, 2011

(65) Prior Publication Data

US 2011/0176001 A1 Jul. 21, 2011

Related U.S. Application Data

(63) Continuation of application No. PCT/CN2008/001676, filed on Sep. 28, 2008.

(51) Int. Cl.
*H04N 17/04* (2006.01)
*H04N 7/18* (2006.01)
*H04N 17/02* (2006.01)

(52) U.S. Cl.
USPC ............ 348/189; 348/143; 348/180; 348/184

(58) Field of Classification Search
USPC .......................... 348/143, 180, 181, 184, 189
See application file for complete search history.

(56) References Cited

U.S. PATENT DOCUMENTS

| 5,883,476 A * | 3/1999 | Noguchi et al. ......... 315/368.12 |
| 2003/0137587 A1* | 7/2003 | Braun .......................... 348/181 |
| 2004/0252228 A1* | 12/2004 | Waki et al. .................. 348/383 |

(Continued)

FOREIGN PATENT DOCUMENTS

| CN | 1308465 | 8/2001 |
| CN | 201001172 | 1/2008 |

(Continued)

OTHER PUBLICATIONS

Machine translation of CN 10217022 (published Jul. 9, 2008, translation generated Sep. 29, 2012).*

(Continued)

*Primary Examiner* — Dave Czekaj
*Assistant Examiner* — David N Werner
(74) *Attorney, Agent, or Firm* — Hamre, Schumann, Mueller & Larson, P.C.

(57) ABSTRACT

A method and a system for monitoring operation of an LED display screen are provided. The method comprises: A. transmitting a monitoring video image to the LED display screen, shooting a corresponding monitoring image by a video camera, and transmitting the monitoring image back to a computer apparatus; and B. analyzing and computing pixels in the monitoring image to determine a working status of modules in the LED display screen. Prior to the step A, the method further comprises a step of: transmitting a geometric video image to the LED display screen, shooting a geometric image by the video camera, transmitting the geometric image back to the computer apparatus, and acquiring and storing coordinate information by the computer apparatus. The system comprises a computer apparatus, a video controller, an LED display screen and at least one video camera. The system is characterized in that: the computer apparatus transmits a monitoring video image to the LED display screen; the video camera shoots a monitoring image; the computer apparatus receives and stores the monitoring image; and the computer apparatus analyzes and computes pixels in the monitoring image to determine a working status of modules in the LED display screen. The present invention features a low cost and strong adaptability.

3 Claims, 6 Drawing Sheets

(56) References Cited

U.S. PATENT DOCUMENTS

2007/0115361 A1* 5/2007 Bolas et al. .................. 348/189
2009/0091623 A1* 4/2009 Krogstad ..................... 348/189
2010/0033567 A1* 2/2010 Gupta et al. ................. 348/143

FOREIGN PATENT DOCUMENTS

| CN | 101217022 | 7/2008 | | |
|---|---|---|---|---|
| CN | 101389007 | 3/2009 | | |
| WO | WO 2010034138 A1 * | 4/2010 | ............... | H04N 7/18 |

OTHER PUBLICATIONS

Machine translation of CN 101389007 A.*

Certified English translation of PCT/CN2008/001676 (Aug. 15, 2013).*

* cited by examiner

METHOD AND SYSTEM FOR MONITORING OPERATION OF AN LED DISPLAY SCREEN

TECHNICAL FIELD

The present invention relates to control, and more particularly, to a method and a system for monitoring operation of an LED display screen.

DESCRIPTION OF RELATED ART

An existing LED display screen system, as shown in FIG. 1, generally comprises a computer apparatus 1A, a video controller 2A and an LED display screen 3A. The computer apparatus 1A plays a content, the video controller 2A transmits the played content to the LED display screen 3A, and the LED display screen 3A displays the played content.

The system as shown in FIG. 1 can only play contents (e.g., videos, photos and texts). As the LED display screen system is usually installed far from an administrator, the administrator cannot check the LED display screen 3A frequently and consequently fails to know abnormal conditions of modules in the LED display screen 3A. Therefore, there exists a need to install a system for monitoring operation of a display screen such that the administrator can find out whether the modules of the LED display screen 3A work normally.

Currently, schemes commonly used for monitoring a display screen are as follows:

1) monitoring the display content of the LED display screen 3A via a network by using a camera As shown in FIG. 2, a video camera 4A, which is installed in front of the LED display screen 3A, shoots and transmits a video to a network video server 5A; and the network video server 5A, which is connected to the Internet, is configured with a fixed IP or domain name and provides video service. The administrator remotely checks the video played by the LED display screen 3A by connecting a client 1B (computer) to the network video server 5A via the network according to the IP or domain name.

Although the content displayed by the LED display screen 3A can be checked at any time by this approach, it can only be monitored manually but cannot be monitored automatically by the client 1B (computer). This approach needs network wiring and requires a person to check the display content frequently, so a high cost has to be paid in order to monitor the LED display screen 3A. Due to limitation imposed by the network bandwidth, video images that are viewed are usually small and thus a bad block on the LED display screen 3A is often failed to be found.

2) monitoring the modules in the LED display screen 3A by using a hardware apparatus As shown in FIG. 3, a monitoring module in the LED display screen 3A monitors a working status of modules in boxes 3A1 at regular intervals, and transmits the monitoring result to a computer 1C via an RS232/485 wire.

One LED display screen 3A is usually comprised of dozens of boxes 3A1 and each of the boxes 3A1 comprises more than ten modules, so one LED display screen 3A usually has hundreds of modules. For this method, all of the modules have to be altered and status data of each of the modules has to be received, resulting in a particularly high cost.

Moreover, LED display screens that have been produced or have been put into service cannot be monitored by this approach. In a word, the existing technology for monitoring a display screen requires a high cost and has weak adaptability.

BRIEF SUMMARY OF THE INVENTION

The objective of the present invention is to provide a method and a system for monitoring operation of an LED display screen in order to overcome such disadvantages in the prior art as a high cost and weak adaptability.

The method for monitoring operation of an LED display screen according to the present invention comprises the following steps of:

A. transmitting a monitoring video image to the LED display screen via a video controller by a computer apparatus, shooting a corresponding monitoring image by a video camera, and transmitting the monitoring image back to the computer apparatus; and B. analyzing and computing pixels in the monitoring image by the computer apparatus to determine a working status of modules in the LED display screen.

Prior to the step A, the method further comprises a step A0 of:

A0. transmitting to the LED display screen via the video controller by the computer apparatus a geometric video image that reflects a physical dimension of the LED display screen, shooting a corresponding geometric image by the video camera, transmitting the geometric image back to the computer apparatus, and according to the geometric video image and the geometric image, acquiring and storing coordinate information reflected in the geometric video image and the geometric image by the computer apparatus.

The step A0 comprises the following sub-steps of:

A01. transmitting to the LED display screen via the video controller by the computer apparatus a geometric video image having a black background and 16 lightspots, wherein the lightspots are located at four corners, midpoints of four edges, as well as ¼th points and ¾th points of the four edges of a correcting region of the LED display screen respectively;

A02. shooting a corresponding geometric image having a corresponding black background and 16 lightspots by the video camera, and transmitting the geometric image back to the computer apparatus; and A03. acquiring and storing coordinate information of the 16 lightspots in the geometric video image and the 16 lightspots in the geometric image by the computer apparatus.

The step A comprises the following sub-steps of:

A1. transmitting two monitoring video images to the LED display screen via the video controller by the computer apparatus respectively, wherein black and white colors of the two monitoring video images are complementary to each other; and A2. shooting two corresponding monitoring images by the video camera, and transmitting the two monitoring images back to the computer apparatus and storing the two monitoring images.

The step B comprises the following sub-steps of:

B1. computing absolute values of differences in color and luminance of each corresponding pixel between the two monitoring images by the computer apparatus to obtain a new composite image; and B2. normalizing the composite image into a resultant image consistent with the LED display screen according to the coordinate information, and determining a working status of each of the modules in the LED display screen according to a status and a position of each of the pixels in the resultant image by the computer apparatus.

The sub-step B2 comprises the following sub-steps of:

B21. correcting distortion of the composite image according to the coordinate information by the computer apparatus to generate the resultant image consistent with the LED display screen;

B22. determining correspondence relationships between the individual pixel positions in the resultant image and the individual modules in the LED display according to the module layout of boxes in the LED display screen and the LED layout of modules in each of the boxes by the computer apparatus; and B23. for each of the modules, if the number of lightspots in the resultant image is larger than a threshold setting, then determining that the module works normally, and otherwise, determining that the module works abnormally.

The system for monitoring operation of an LED display screen according to the present invention comprises a computer apparatus, a video controller, an LED display screen and at least one video camera. The computer apparatus, the video controller and the LED display screen are connected in sequence, the computer apparatus transmits a video image to the LED display screen via the video controller, and the video camera shoots an image displayed by the LED display screen. The system is characterized in that, the video camera is connected with the computer apparatus, wherein:

the computer apparatus transmits a monitoring video image to the LED display screen, the video camera shoots a corresponding monitoring image, and the computer apparatus receives and stores the monitoring image shot by the video camera; and the computer apparatus analyzes and computes pixels in the monitoring image to determine a working status of modules in the LED display screen.

The computer apparatus transmits to the LED display screen a geometric video image that reflects a physical dimension of the LED display screen;

the video camera shoots a corresponding geometric image, and the geometric image is transmitted back to the computer apparatus; and according to the geometrical video image and the geometrical image, the computer apparatus acquires and stores coordinate information reflected in the geometrical video image and the geometrical image.

The present invention has the following beneficial effect. In the present invention, the computer apparatus transmits a monitoring video image to the LED display screen via the video controller, the video camera shoots a corresponding monitoring image, the monitoring image is transmitted back to the computer apparatus, and the computer apparatus analyzes and computes pixels in the monitoring image to determine a working status of modules in the LED display screen. In these processes, according to the present invention, except for connecting the video camera with the computer apparatus, no redundant network wiring is needed, and there is also no need for a person to check display contents frequently; therefore, the present invention features a low cost. In particular, according to the present invention, there is no need to alter the original hardware (the LED display screen), and this is particularly suitable for monitoring existing LED display screens that have been produced or have been put into service. The cost for altering the system is very low and thus, the present invention has particularly strong adaptability.

In the present invention, the computer apparatus transmits to the LED display screen via the video controller a geometric video image that reflects a physical dimension of the LED display screen, the video camera shoots a corresponding geometric image, the geometric image is transmitted back to the computer apparatus, and according to the geometrical video image and the geometrical image, the computer apparatus acquires and stores coordinate information reflected in the geometrical video image and the geometrical image. The computer apparatus can obtain an image consistent with the LED display screen according to the coordinate information, which contributes to the strong operability of the present invention. Thus, the practicability and the operability of the present invention are further enhanced.

In the present invention, the computer apparatus transmits two monitoring video images to the LED display screen via the video controller respectively, wherein black and white colors of the two monitoring video images are complementary to each other; the video camera shoots two corresponding monitoring images, and the two monitoring images are transmitted back to the computer apparatus and stored respectively; and the computer apparatus computes absolute values of differences in color and luminance of each corresponding pixel between the two monitoring images to obtain a new composite image. In the present invention, the two monitoring video images having complementary black and white colors make the new composite image particularly distinct, and have the composite image and an image obtained (e.g., a resultant image) through the subsequent process contribute to more complete, intuitive and effective determination, thereby further enhancing the practicability of the present invention.

DETAILED DESCRIPTION OF THE INVENTION

Hereinafter, the present invention will be further described in detail with reference to the attached drawings and embodiments.

Figure 1:
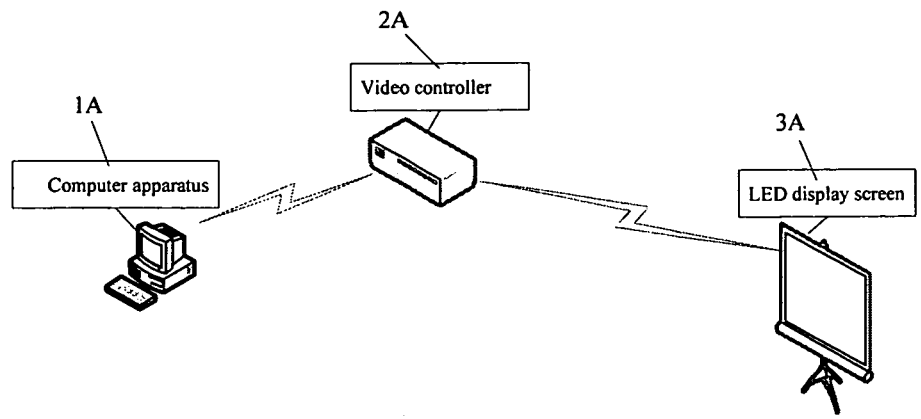
FIG. 1 is a schematic view of an LED display screen system in the prior art.
Figure 2:
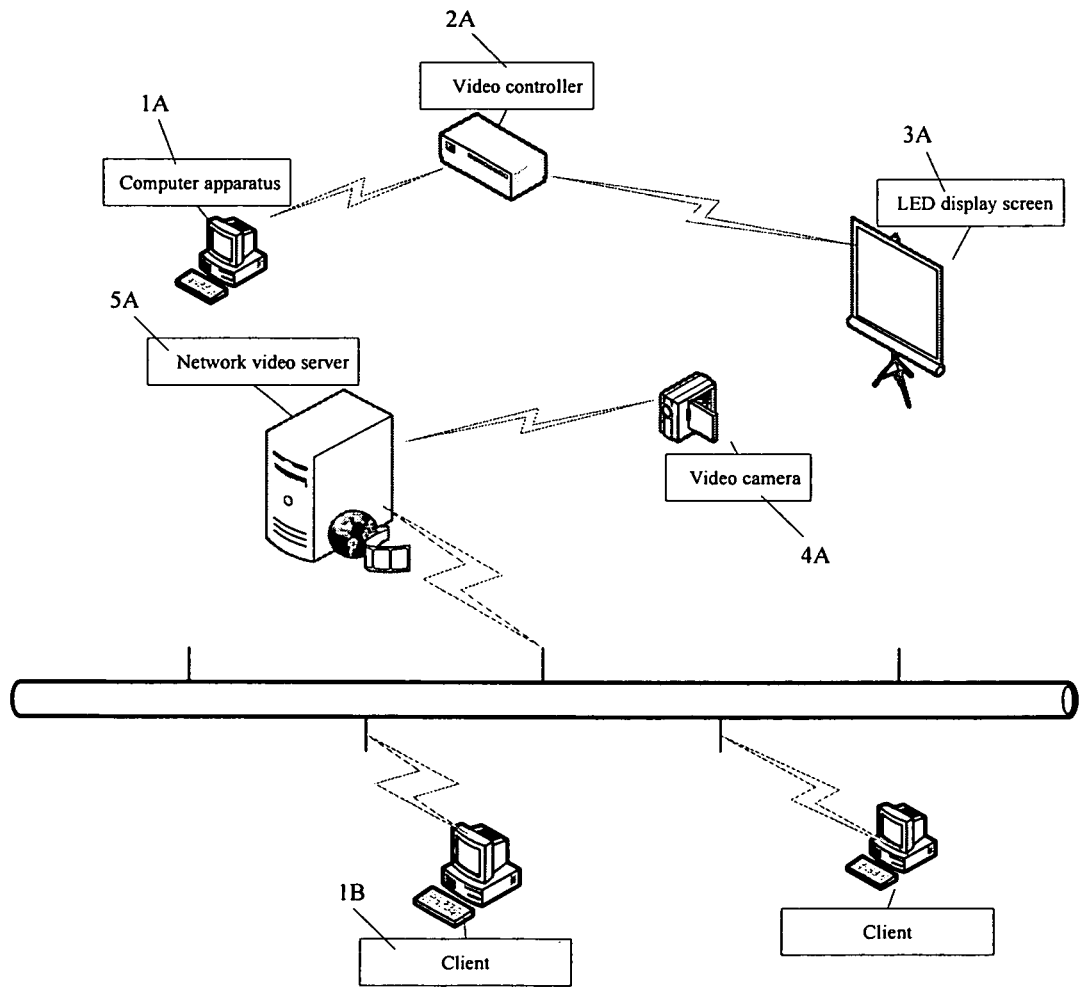
FIG. 2 is a schematic view of a system for monitoring an LED display screen in the prior art.
Figure 3:
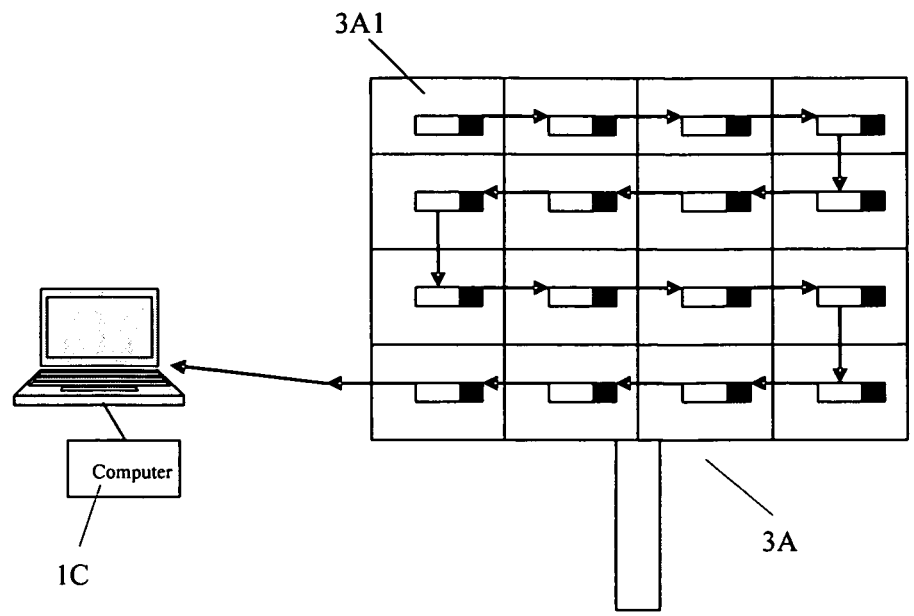
FIG. 3 is a schematic view of another system for monitoring an LED display screen in the prior art.
Figure 4:
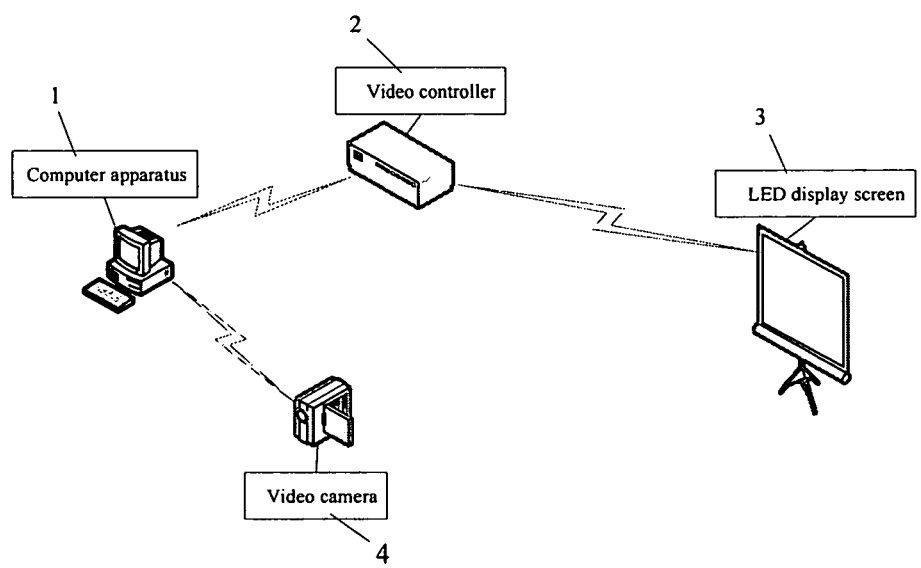
FIG. 4 is a schematic view of a system of the present invention.

As shown in FIG. 4, the present invention comprises a computer apparatus 1, a video controller 2, an LED display screen 3 and at least one video camera 4. The computer apparatus 1, the video controller 2 and the LED display screen 3 are connected in sequence; the computer apparatus 1 transmits a video image to the LED display screen 3 via the video controller 2; the video camera 4 shoots the image displayed by the LED display screen 3; and the video camera 4 is connected with the computer apparatus 1.

As shown in FIG. 4, the computer apparatus 1 transmits to the LED display screen 3 a geometric video image that reflects a physical dimension of the LED display screen 3 and a monitoring video image; the video camera 4 shoots a corresponding geometric image and a corresponding monitoring image; and the computer apparatus 1 receives and stores the geometric image and the monitoring image shot by the video camera 4.

As shown in FIG. 4, according to the geometrical video image and the geometrical image, the computer apparatus 1 acquires and stores coordinate information reflected in the geometrical video image and the geometrical image; and then, the computer apparatus 1 analyzes and computes pixels in the monitoring image to determine a working status of modules in the LED display screen 3.

The method used by the present invention comprises the following steps of:

I. transmitting a monitoring video image to the LED display screen 3 via the video controller 2 by the computer apparatus 1, shooting a corresponding monitoring image by the video camera 4, and transmitting the monitoring image back to the computer apparatus 1; and II. analyzing and computing pixels in the monitoring image by the computer apparatus 1 to determine a working status of modules in the LED display screen 3.

Figure 5:
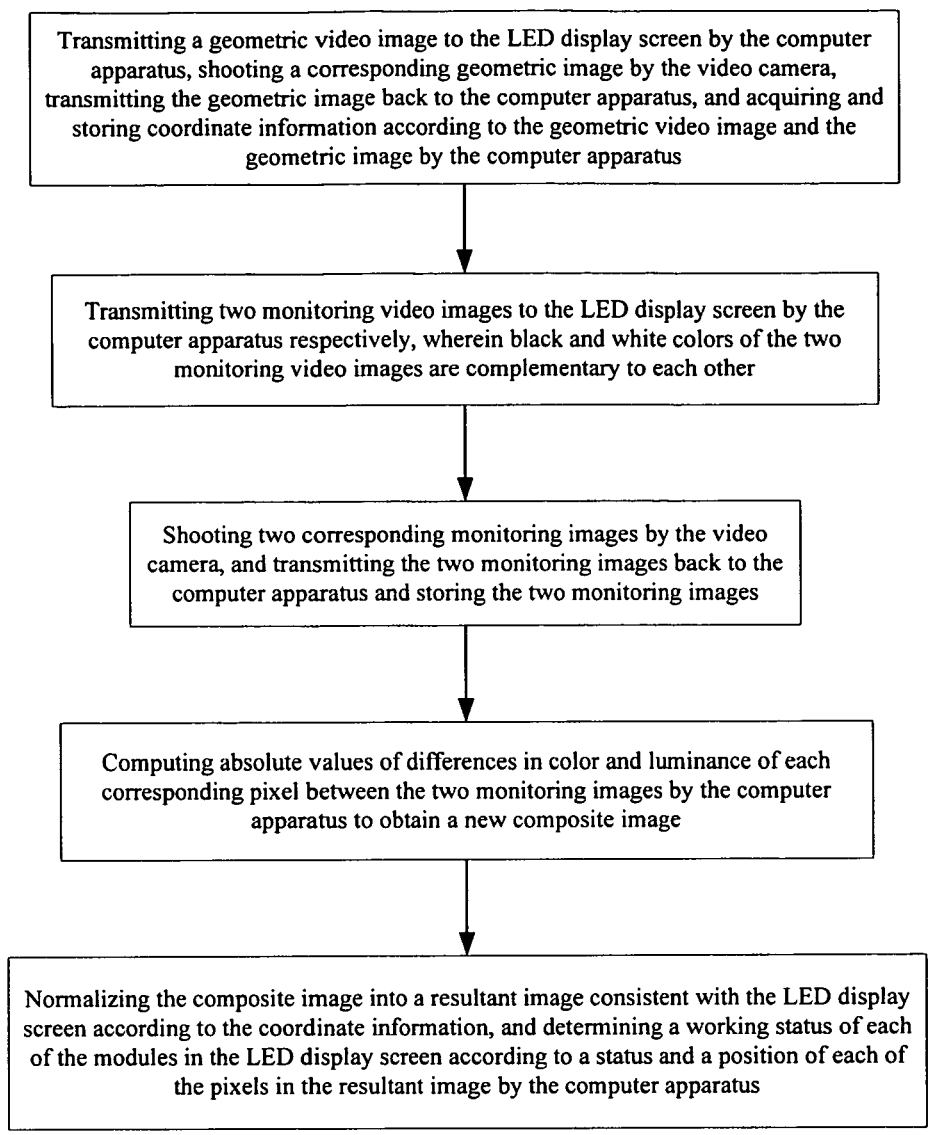
FIG. 5 is a schematic view showing a basic control flow of the present invention.

As shown in FIG. 4 and FIG. 5, a basic control flow of the present invention comprises the following steps of:

A) transmitting to the LED display screen 3 via the video controller 2 by the computer apparatus 1 a geometric video image that reflects a physical dimension of the LED display screen 3, shooting a corresponding geometric image by the video camera 4, transmitting the geometric image back to the computer apparatus 1, and according to the geometric video image and the geometric image, acquiring and storing coordinate information reflected in the geometric video image and the geometric image by the computer apparatus 1;

B) transmitting two monitoring video images to the LED display screen 3 via the video controller 2 by the computer apparatus 1 respectively, wherein black and white colors of the two monitoring video images are complementary to each other;

C) shooting two corresponding monitoring images by the video camera 4, and transmitting the two monitoring images back to the computer apparatus 1 and storing the two monitoring images;

D) computing absolute values of differences in color and luminance of each corresponding pixel between the two monitoring images by the computer apparatus 1 to obtain a new composite image; and E) normalizing the composite image into a resultant image consistent with the LED display screen 3 according to the coordinate information, and determining a working status of each of the modules in the LED display screen 3 according to a status and a position of each of the pixels in the resultant image by the computer apparatus 1.

Figure 6:
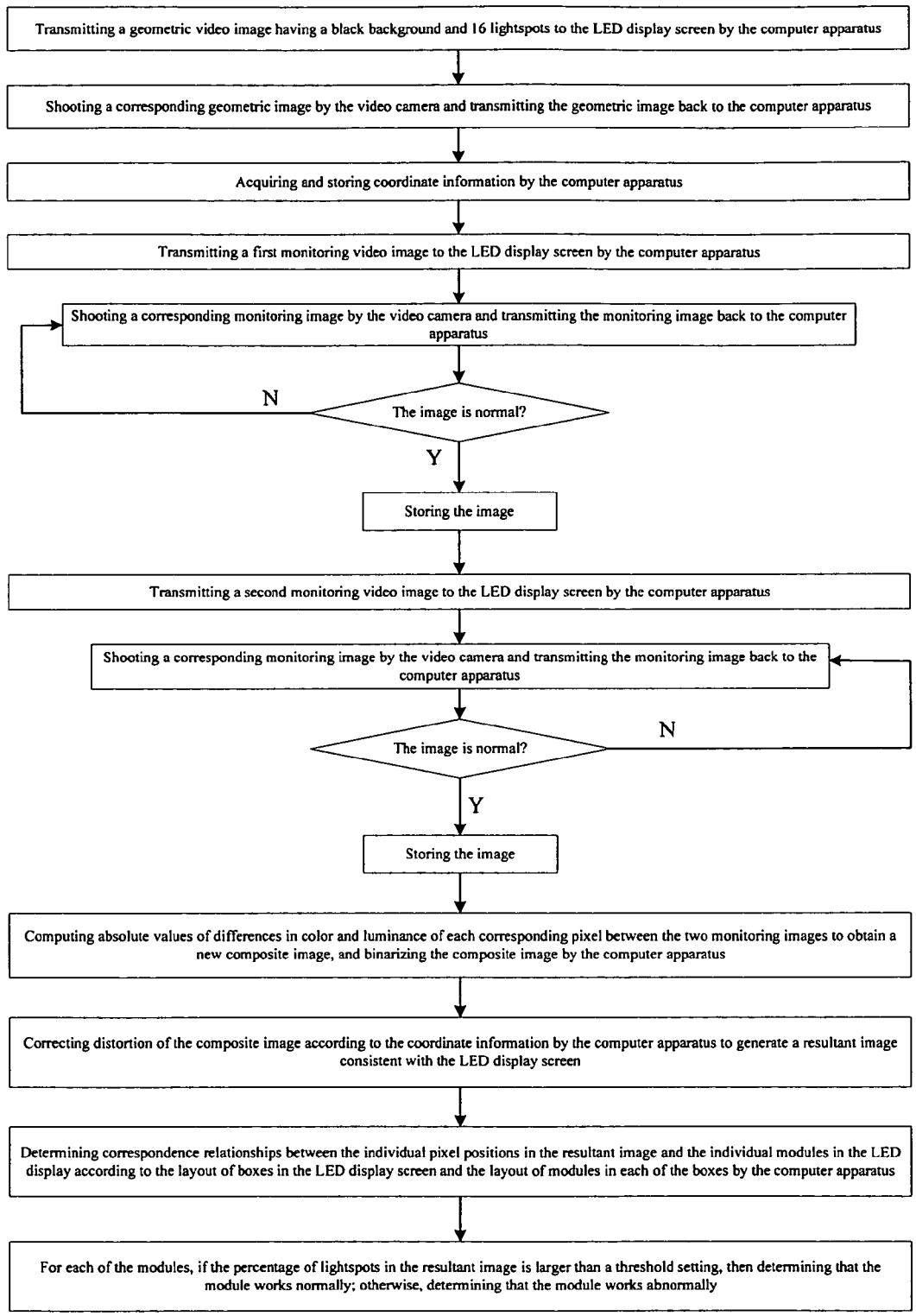
FIG. 6 is a schematic view showing a specific control flow of the present invention.
Figure 7:
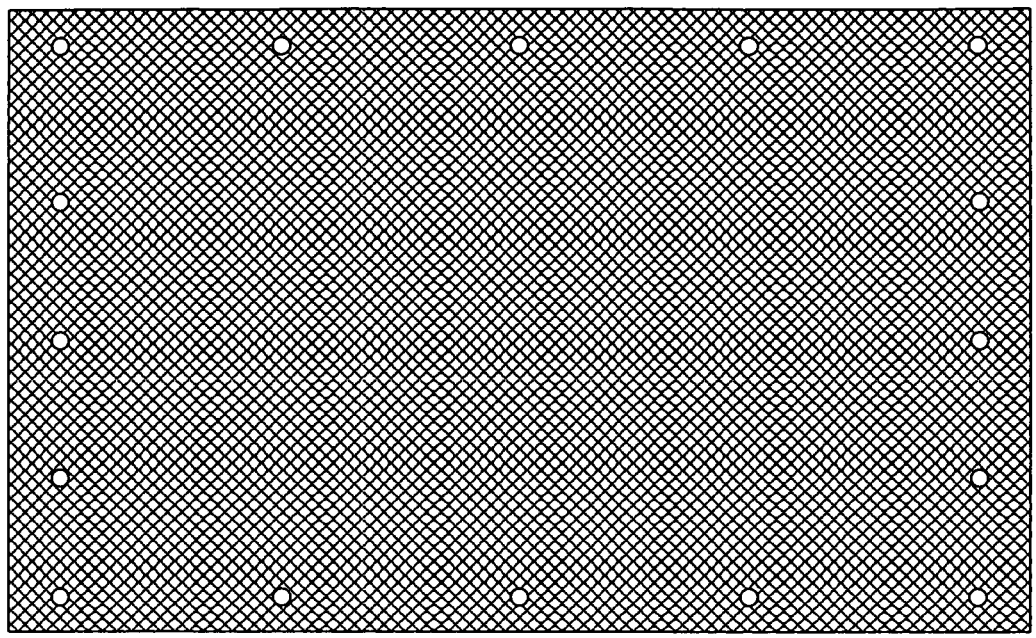
FIG. 7 is a schematic view of a geometric video image according to the present invention.
Figure 8:
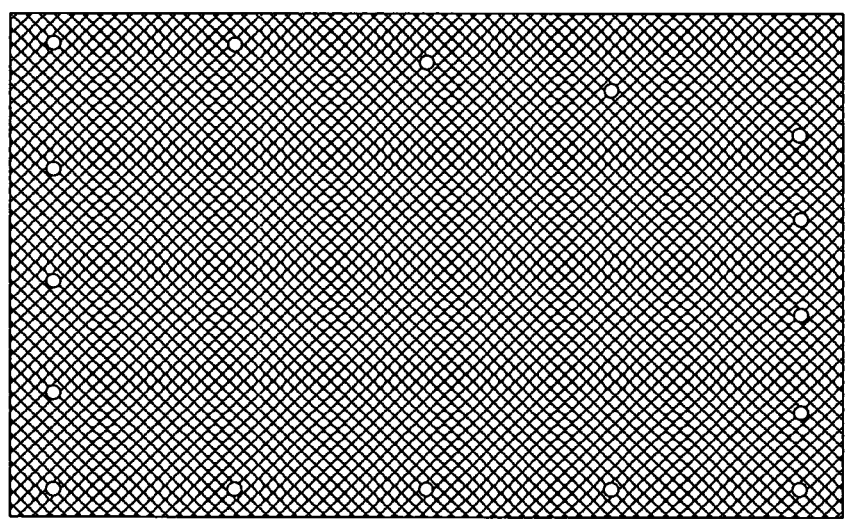
FIG. 8 is a schematic view of a geometric image according to the present invention.
Figure 9:
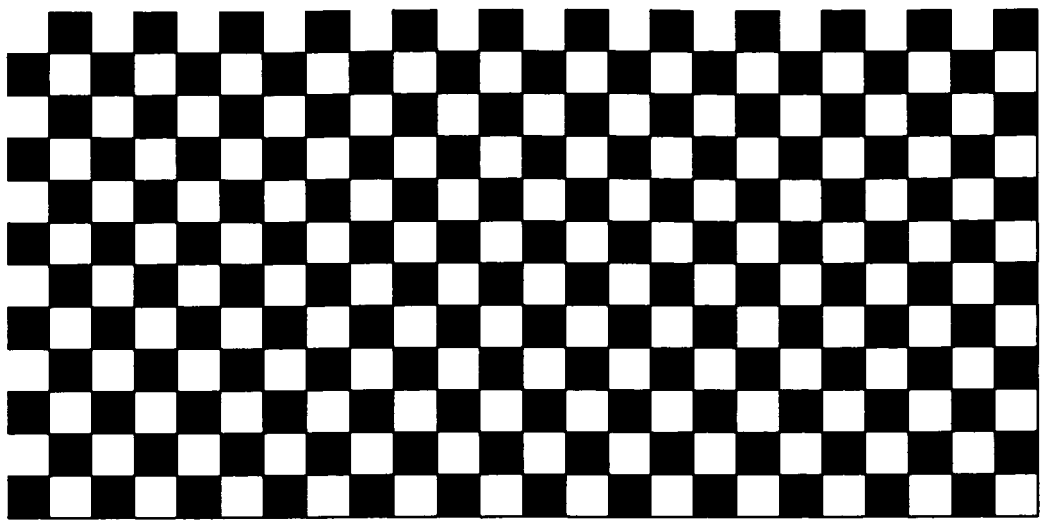
FIG. 9 is a schematic view of a first monitoring video image according to the present invention.

As shown in FIG. 4 and FIG. 6, a specific control flow of the present invention comprises the following steps of:

1. as shown in FIG. 7, transmitting to the LED display screen 3 via the video controller 2 by the computer apparatus 1 a geometric video image having a black background and 16 lightspots, wherein the lightspots are located at four corners, midpoints of four edges, as well as ¼th points and ¾th points of the four edges of a correcting region of the LED display screen 3 respectively, and in FIG. 7, the "X"-shaped shaded portion represents the black background and "O" shapes represent the lightspots;

2. shooting a corresponding geometric image by the video camera 4 and transmitting the geometric image back to the computer apparatus 1, wherein as shown in FIG. 8, the geometric image has a corresponding black background and 16 lightspots, and in FIG. 7, the "X"-shaped shaded portion represents the black background and "O" shapes represent the lightspots;

3. acquiring and storing coordinate information of the 16 lightspots in the geometric video image and the 16 lightspots in the geometric image respectively by the computer apparatus 1;

4. transmitting a first monitoring video image to the LED display screen 3 via the video controller 2 by the computer apparatus 1, wherein as shown in FIG. 9, the first monitoring video image is an image where black and white squares are alternated longitudinally and transversely;

5. shooting a first monitoring image by the video camera 4 and transmitting the first monitoring image back to the computer apparatus 1;

6. inspecting whether the received first monitoring image is normal by the computer apparatus 1, i.e., determining whether the image is valid and true by the computer apparatus 1, wherein the following operations are performed:

61. If no error occurs during shooting of the image and no abnormal data exists in the obtained image, then it shows that the image is valid.

During shooting of the image, if a malfunction occurs to the video camera 4, then the video camera 4 may fail to shoot an image or may obtain a substantially black image, making it impossible to truly reflect the image played by the LED display screen 3.

If the video camera 4 is exposed to excessive reflection of sunlight from the LED display screen 3 or a problem exists in the video camera 4, then it is possible that a substantially white image will be obtained, making it impossible to truly reflect the frame played by the display screen.

During determination of whether the image is true, statistics is made on luminance values of all the pixels in the image. If the number of spots whose luminance value is smaller than 32 accounts for 90% or more of the number of total spots, then it is determined that the image is untrue; and likewise, if the number of spots whose luminance value is larger than 191 accounts for 90% or more of the number of the total spots, then it is determined that the image is untrue.

The luminance value of the color is computed according to the following formula:

$$L = R*0.299 + G*0.587 + B*0.114$$

where L represents a luminance value of a spot, R represents a red value of the spot, G represents a green value of the spot, and B represents a blue value of the spot.

If it is determined that the image is normal, then the following step 7 is continued.

Figure 10:
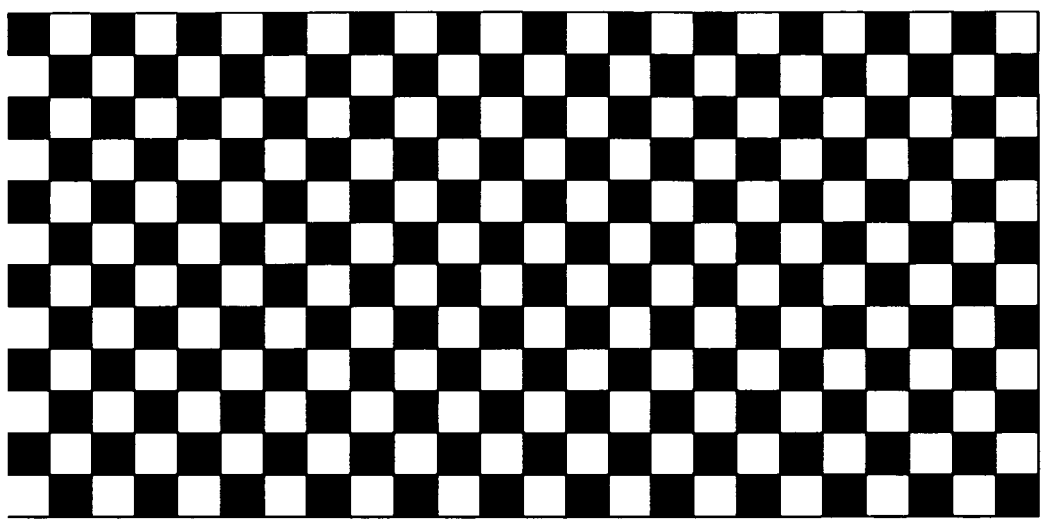
FIG. 10 is a schematic view of a second monitoring video image according to the present invention.

62. Otherwise, if it is determined that the image is abnormal, then the aforesaid step 5 is executed again for shooting an image. Generally speaking, it may be set to exit and end the flow if the image is still abnormal after the step 5 has been repeated continuously for 5 times;

7. storing the first monitoring image by the computer apparatus 1;

8. transmitting a second monitoring video image to the LED display screen 3 via the video controller 2 by the computer apparatus 1, wherein as shown in FIG. 10, the second monitoring video image is also an image where black and white squares are alternated longitudinally and transversely, and black and white colors of the first monitoring video image and the second monitoring video image are complementary to each other, in other words, when the first monitoring video image has a white square at a position, the second monitoring video image has a black square at a corresponding position; and when the first monitoring video image has a black square at a position, the second monitoring video image has a white square at a corresponding position;

9. shooting a second monitoring image by the video camera 4 and transmitting the second monitoring image back to the computer apparatus 1;

10. inspecting whether the received second monitoring image is normal by the compute apparatus 1, wherein the following operations are performed:
   101. If it is determined that the image is normal, then the following step 11 is continued.
   102. Otherwise, if it is determined that the image is abnormal, then the aforesaid step 9 is executed again for shooting an image. Generally speaking, it may also be set to exit and end the flow if the image is still abnormal after the step 9 has been repeated continuously for 5 times;

11. storing the second monitoring image by the computer apparatus 1;

12. computing absolute values of differences in color and luminance of each corresponding pixel between the two monitoring images to obtain a new composite image, and binarizing the composite image by the computer apparatus 1, wherein:

The binarization is performed as follows:

A given image f(x,y) has a tonal range $[Z_1, Z_2]$, $t \in [Z_1, Z_2]$, and if:

$$f_t(x,y) = \begin{cases} m, & f(x,y) \geq t \\ n, & f(x,y) < t \end{cases}$$

then $f_t(x,y)$ is a binary image of the image f(x,y) with t as a threshold.

In this embodiment, it is assumed that t=128, m=255, and n=0;

13. correcting distortion of the composite image according to the coordinate information by the computer apparatus 1 to generate a resultant image consistent with the LED display screen 3;

14. determining correspondence relationships between the individual pixel positions in the resultant image and the individual modules in the LED display according to the module layout of boxes in the LED display screen 3 and the LED layout of modules in each of the boxes by the computer apparatus 1. Here, it is assumed that the module layout of boxes in the LED display screen 3 is M×N and the LED layout of modules in each of the boxes is K×L. As a result, four corners of the resultant image correspond to the four corners of the LED display screen 3. Also, assuming that the image has W×H pixels, then a display screen LED position (u,v) corresponding to the pixel (x,y) is:

$$u = \frac{M \times K}{W} x$$
$$v = \frac{N \times L}{H} y$$

and coordinates of the box module corresponding to the pixel (X,Y) are:

$$x_x = \frac{u}{K}$$
$$y_x = \frac{v}{L};$$

and 15. for each of the modules, if the percentage of lightspots (i.e., white spots, the red value, the green value and the blue value are all 255) in the resultant image is larger than a threshold setting T (T=70%), namely, if the percentage of the lightspots is larger than 70%, then determining that the module works normally; otherwise, if the percentage of dark spots (i.e., black spots, the red value, the green value and the blue value are all 0) is no less than 30%, then determining that the module works abnormally.

Actually, based on the same or similar working manners, the present invention can analyze the modules according to variations of the image while playing program contents. This can be implemented by those of ordinary skill in the art according to the illumination of the aforesaid embodiments without making creative efforts, and thus will not be further described herein.

According to the above description, although the basic structure and the method of the present invention have been elucidated with reference to the aforesaid embodiments, without departing the spirit of the present invention, modifications/alterations or a combination thereof can be readily made by those of ordinary skill in the art according to the aforesaid illumination without making creative efforts, and thus will not be further described herein.

INDUSTRIAL APPLICABILITY

In the present invention, the computer apparatus transmits a monitoring video image to the LED display screen via the video controller, the video camera shoots a corresponding monitoring image, the monitoring image is transmitted back to the computer apparatus, and the computer apparatus analyzes and computes pixels in the monitoring image to determine a working status of modules in the LED display screen. In these processes, according to the present invention, except for connecting the video camera with the computer apparatus, no redundant network wiring is needed, and there is also no need for a person to check display contents frequently; therefore, the present invention features a low cost. In particular, according to the present invention, there is no need to alter the original hardware (the LED display screen), and this is particularly suitable for monitoring existing LED display screens that have been produced or have been put into service. The cost for altering the system is very low and thus, the present invention has particularly strong adaptability.

The invention claimed is:

1. A method for monitoring operation of an LED display screen, comprising the following steps of:
   A0: transmitting to the LED display screen via a video controller by a computer apparatus a geometric video image that reflects a physical dimension of the LED display screen, shooting a corresponding geometric image by a video camera, transmitting the geometric image back to the computer apparatus, and according to the geometric video image and the geometric image, acquiring and storing coordinate information reflected in the geometric video image and the geometric image by the computer apparatus;
   A1: transmitting two monitoring video images to the LED display screen via the video controller by the computer apparatus respectively, wherein black and white colors of the two monitoring video images are complementary to each other;
   A2: shooting two corresponding monitoring images by the video camera, and transmitting the two monitoring images back to the computer apparatus and storing the two monitoring images;

B1: computing absolute values of differences in color and luminance of each corresponding pixel between the two monitoring images by the computer apparatus to obtain a new composite image;

B21: correcting distortion of the composite image according to the coordinate information by the computer apparatus to generate a resultant image consistent with the LED display screen;

B22: determining correspondence relationships between the individual pixel positions in the resultant image and the individual modules in the LED display according to the module layout of boxes in the LED display screen and the LED layout of modules in each of the boxes by the computer apparatus; and B23: for each of the modules, if the number of lightspots in the resultant image is larger than a threshold setting, determining that the module works normally, and otherwise, determining that the module works abnormally.

2. The method for monitoring operation of an LED display screen of claim 1, wherein step A0 comprises the following sub-steps of:

A01. transmitting to the LED display screen via the video controller by the computer apparatus a geometric video image having a black background and 16 lightspots, wherein the lightspots are located at four corners, midpoints of four edges, as well as ¼th points and ¾th points of the four edges of a correcting region of the LED display screen respectively;

A02. shooting a corresponding geometric image having a corresponding black background and 16 lightspots by the video camera, and transmitting the geometric image back to the computer apparatus; and A03. acquiring and storing coordinate information of the 16 lightspots in the geometric video image and the 16 lightspots in the geometric image respectively by the computer apparatus.

3. A system for monitoring operation of an LED display screen, comprising a computer apparatus, a video controller, an LED display screen and at least one video camera, the computer apparatus, the video controller and the LED display screen being connected in sequence, the computer apparatus transmitting a video image to the LED display screen via the video controller, and the video camera shooting an image displayed by the LED display screen, wherein the video camera is connected with the computer apparatus, wherein:

the computer apparatus transmits a geometric video image that reflects a physical dimension of the LED display screen to the LED display screen via the video controller, the video camera shoots a corresponding geometric image and transmits the geometric image back to the computer apparatus, and according to the geometric video image and the geometric image, the computer apparatus acquires and stores coordinate information reflected in the geometric video image and the geometric image;

the computer apparatus transmits two monitoring video images to the LED display screen via the video controller respectively, wherein black and white colors of the two monitoring video images are complementary to each other;

the video camera shoots two corresponding monitoring images, and transmits the two monitoring images back to the computer apparatus and the computer apparatus stores the two monitoring images;

the computer apparatus computes absolute values of differences in color and luminance of each corresponding pixel between the two monitoring images to obtain a new composite image;

the computer apparatus corrects distortion of the composite image according to the coordinate information to generate the resultant image consistent with the LED display screen;

the computer apparatus determines correspondence relationships between the individual pixel positions in the resultant image and the individual modules in the LED display according to the module layout of boxes in the LED display screen and the LED layout of modules in each of the boxes; and for each of the modules, if the number of lightspots in the resultant image is larger than a threshold setting, then the computer apparatus determines that the module works normally, and otherwise, determines that the module works abnormally.

* * * * *